(12) United States Patent
Garant et al.

(10) Patent No.: US 9,498,837 B2
(45) Date of Patent: Nov. 22, 2016

(54) VACUUM TRANSITION FOR SOLDER BUMP MOLD FILLING

(75) Inventors: John J. Garant, Hopewell Junction, NY (US); Robert G. Haas, Hopewell Junction, NY (US); Bouwe W. Leenstra, Hopewell Junction, NY (US); Phillip W. Palmatier, Hopewell Junction, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 825 days.

(21) Appl. No.: 12/551,755

(22) Filed: Sep. 1, 2009

(65) Prior Publication Data

US 2011/0049759 A1    Mar. 3, 2011

(51) Int. Cl.
*B23K 31/02*    (2006.01)
*B23K 35/12*    (2006.01)
*B23K 3/06*    (2006.01)

(52) U.S. Cl.
CPC ......... *B23K 3/0623* (2013.01); *B23K 2201/42* (2013.01)

(58) Field of Classification Search
USPC .................................. 228/256–262, 33–43
See application file for complete search history.

(56) References Cited

U.S. PATENT DOCUMENTS

| | | | |
|---|---|---|---|
| 5,244,143 A * | 9/1993 | Ference et al. | 228/180.21 |
| 5,250,103 A * | 10/1993 | Yamauchi et al. | 75/584 |
| 5,620,927 A | 4/1997 | Lee | |
| 6,189,772 B1 | 2/2001 | Hembree | |
| 6,231,333 B1 | 5/2001 | Gruber et al. | |
| 6,452,117 B2 | 9/2002 | Curcio et al. | |
| 6,581,280 B2 | 6/2003 | Curcio et al. | |
| 7,200,930 B2 | 4/2007 | Khandros et al. | |
| 2001/0027842 A1 | 10/2001 | Curcio et al. | |
| 2005/0263571 A1 | 12/2005 | Belanger et al. | |
| 2006/0035454 A1 | 2/2006 | Belanger et al. | |
| 2006/0102663 A1 | 5/2006 | McGeoch | |
| 2007/0246853 A1 | 10/2007 | Chey et al. | |
| 2008/0048008 A1 | 2/2008 | Schultz | |
| 2008/0302860 A1 | 12/2008 | Biggs et al. | |
| 2009/0014146 A1 | 1/2009 | Budd et al. | |
| 2009/0179020 A1 | 7/2009 | Cohen et al. | |

FOREIGN PATENT DOCUMENTS

DE    19653499 A1    6/1997

OTHER PUBLICATIONS

PCT/US2010/0478078 Search Report and Written Opinion.

* cited by examiner

*Primary Examiner* — Aaron Austin
*Assistant Examiner* — Megha Gaitonde
(74) *Attorney, Agent, or Firm* — Cantor Colburn LLP; Steven Meyers

(57) ABSTRACT

A bond metal injection tool can include a fill head having a sealed chamber for containing a molten bond metal (e.g., solder) and a gas, and a nozzle for directing a flow of the molten bond metal into cavities in a major surface of a mold. A pressure control device can controllably apply pressure within the chamber to eject the bond metal from the nozzle into the cavities. The pressure control device may also controllably reduce a pressure within the chamber to inhibit the bond metal from being ejected from the nozzle, such as when the fill head is being moved onto the mold surface from a parking location or when the fill head is being moved off the mold surface onto a parking location.

9 Claims, 6 Drawing Sheets

VACUUM TRANSITION FOR SOLDER BUMP MOLD FILLING

BACKGROUND OF THE INVENTION

1. Field of the Invention

The present invention relates to a tool and a process for use in manufacturing or packaging of microelectronic elements, e.g., semiconductor wafers and chips, and more specifically to a bond metal injection tool, such as used for filling a mold with solder, and a process for forming bumps on a microelectronic element.

2. Description of the Related Art

"Flip-chip packaging" refers to a technique in which a microelectronic element such as semiconductor chip is placed face-down on a chip carrier with the contacts at the face of the chip bonded to contacts of the chip carrier. In a typical process, solder bumps are formed on the contacts of semiconductor chips while the chips are still attached together at dicing lanes in form of a wafer. Such process can be referred to as "wafer bumping". Injection Molding Soldering (IMS) is a technique developed to address the cost vs. quality issues associated with current wafer bumping technologies. IMS applied to wafer bumping has been referred to as "C4NP" (Controlled Collapse Chip Connection New Process) by International Business Machines Corporation.

C4NP involves a bond metal injection tool 1 filling specially designed pits or "cavities" 14 at a major surface 12 of a mold 10 (FIG. 1) using a fill head 20 which has a chamber 22 containing molten solder 24 and a nozzle 26 for ejecting the solder. The mold 10 can be a removable "mold plate" superposed upon a hot plate 50, which is chosen for its thermal conductivity. The mold plate 10 typically is not wettable by solder and can be formed of a material such as borosilicate glass which is selected for its transparency in permitting optical inspection and for its thermal properties similar to silicon. The fill head has a nozzle 26 through which molten solder is injected into the cavities of the mold. For example, air pressure within the chamber can force molten solder outward through the nozzle. When the cavities are being filled, a hot plate 50 supporting the mold plate typically is maintained at a temperature below the melting temperature of the solder, so as to maintain the solder in the mold plate cavities below the melting temperature.

When the head 20 has finished filling a particular mold plate, it is moved onto a "parking space" 30 where it stays temporarily, with the molten solder present in the chamber and nozzle. The surface 32 of the parking space can be raised somewhat (e.g., 0.2 to 1.5 mm) above the major surface 12 of the mold plate. A gap 34 of less than a millimeter is typically disposed between an edge surface 36 of the parking space and an adjacent edge surface 16 of the mold plate when the parking space is ready for the head 20 to be moved from the parking space to the mold plate, or when the head is moved from the mold plate onto another parking space (not shown). The mold plate and the parking space can be separated from each other after the solder head is moved from the mold plate onto the parking space.

While the head rests on the parking space as seen in FIG. 1, the solder is constrained to the space between a surface 28 of the fill head and a confronting surface 32 of the parking space by a seal 23. Likewise, when the head is being used to fill the cavities as seen in FIG. 2, the solder is constrained between the fill head surface and the major surface 12 of the mold plate. One difficulty occurs when the head moves between parking space and the mold plate. The transition across the gap can cause solder to be drawn out from the nozzle 26 or shaken loose therefrom, leaving a mass 40 (FIG. 2) of solder at the gap between the parking space and mold plate or leaving a streak 42 of solder on the major surface 12 of the mold plate. Such masses and streaks, which are potential sources of defects, must be cleaned from the mold plate and the parking space. This impacts throughput and quality in the mold-filling operation.

Another problem is that solder oxidizes when it is molten and exposed to oxygen. Oxidized solder, if allowed to enter the cavities, can cause the bumps made of that solder to be mechanically fragile and ultimately, can increase electrical resistance in the solder bump connections between chip and chip carrier. Solder 40, 42, that exits the nozzle when the head moves onto the mold plate can become oxidized and cause these potential defects.

SUMMARY OF THE INVENTION

A bond metal injection tool is provided according to an aspect of the invention. Such tool can include a fill head having a sealed chamber for containing a molten bond metal and a gas, and a nozzle for directing a flow of the molten bond metal into cavities in a major surface of a mold. A pressure control device can controllably apply pressure within the chamber to eject the bond metal from the nozzle into the cavities. The pressure control device may also controllably reduce a pressure within the chamber to inhibit the bond metal from being ejected from the nozzle.

In accordance with another aspect of the invention, a bond metal injection tool can be provided which can include a fill head having a chamber for containing a molten bond metal, and a nozzle opening juxtaposable with a major surface of a mold for directing a flow of the molten bond metal into cavities in the major surface. A parking space may have a parking surface for the fill head to sealably contact and an edge surface extending away from the parking surface. Some portion of the edge surface can be spaced apart from an adjacent edge surface of the mold so as to define a gap. The fill head can be movable between a first position in which the nozzle opening is juxtaposed with the major surface or at least one of the cavities therein, and a second position in which the nozzle opening is juxtaposed with the parking surface. In such case, the bond metal injection tool may further include a second nozzle and control apparatus operable to automatically direct a gas flow through the second nozzle to the gap when the nozzle opening is moved between the parking surface and the mold major surface or between the mold major surface and the parking surface.

In accordance with another aspect of the invention, a method is provided for forming bond metal bumps on a microelectronic element. In such method, pressure can be applied within a chamber containing molten bond metal to eject the molten bond metal from a nozzle into cavities in a major surface of a mold. At another time, the pressure within the chamber containing the molten bond metal can be reduced to a level below that used when the cavities are being filled. The pressure may be reduced to a level below atmospheric level, that is, negative pressure relative to the atmospheric ambient pressure. The reduced pressure can inhibit the bond metal from being ejected from the nozzle at times other than when the nozzle is supplying the bond metal to the cavities. After filling the cavities in the mold, the bond metal therein can be joined with wettable elements, e.g., contacts, of a microelectronic element (e.g., a wafer or chip or a plurality of chips) and the mold can be removed, leaving bumps containing the bond metal joined with the wettable elements.

In accordance with another aspect of the invention, a method is provided for forming bond metal bumps on a microelectronic element. In such method, a nozzle opening of a fill head having a chamber for containing a molten bond metal can be juxtaposed with a major surface of a mold and a flow of the molten bond metal can be directed into cavities in the mold's major surface. The nozzle opening can then be moved into a position juxtaposed with a parking surface adjacent to the major surface, wherein such movement can traverse a gap between the edge surfaces between the parking space and the mold major surface. While moving the nozzle, a flow of a non-oxidizing gas can be automatically directed through a second nozzle to the gap when the nozzle opening is moved between the major surface and the parking surface. Then, once the mold cavities have been filled, the bond metal in the mold cavities can be joined with wettable elements, e.g., contacts of a microelectronic element. When the mold is removed, bumps can remain on the microelectronic element, the bumps being joined with the wettable elements or contacts of the microelectronic element.

DETAILED DESCRIPTION

Figure 1:
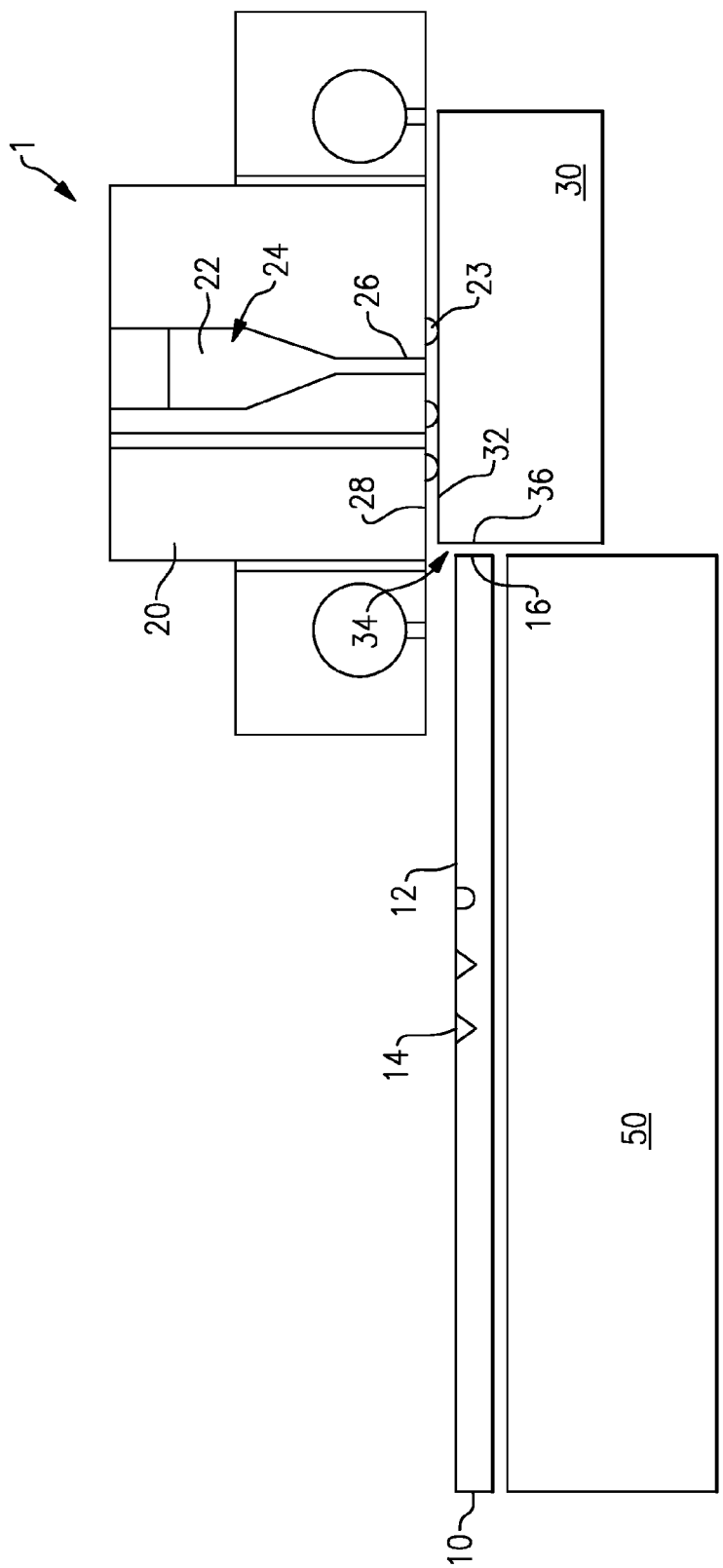
FIG. 1 is a sectional view illustrating an arrangement including a bond metal injection tool in accordance with the prior art, the tool being parked at a parking location.
Figure 2:
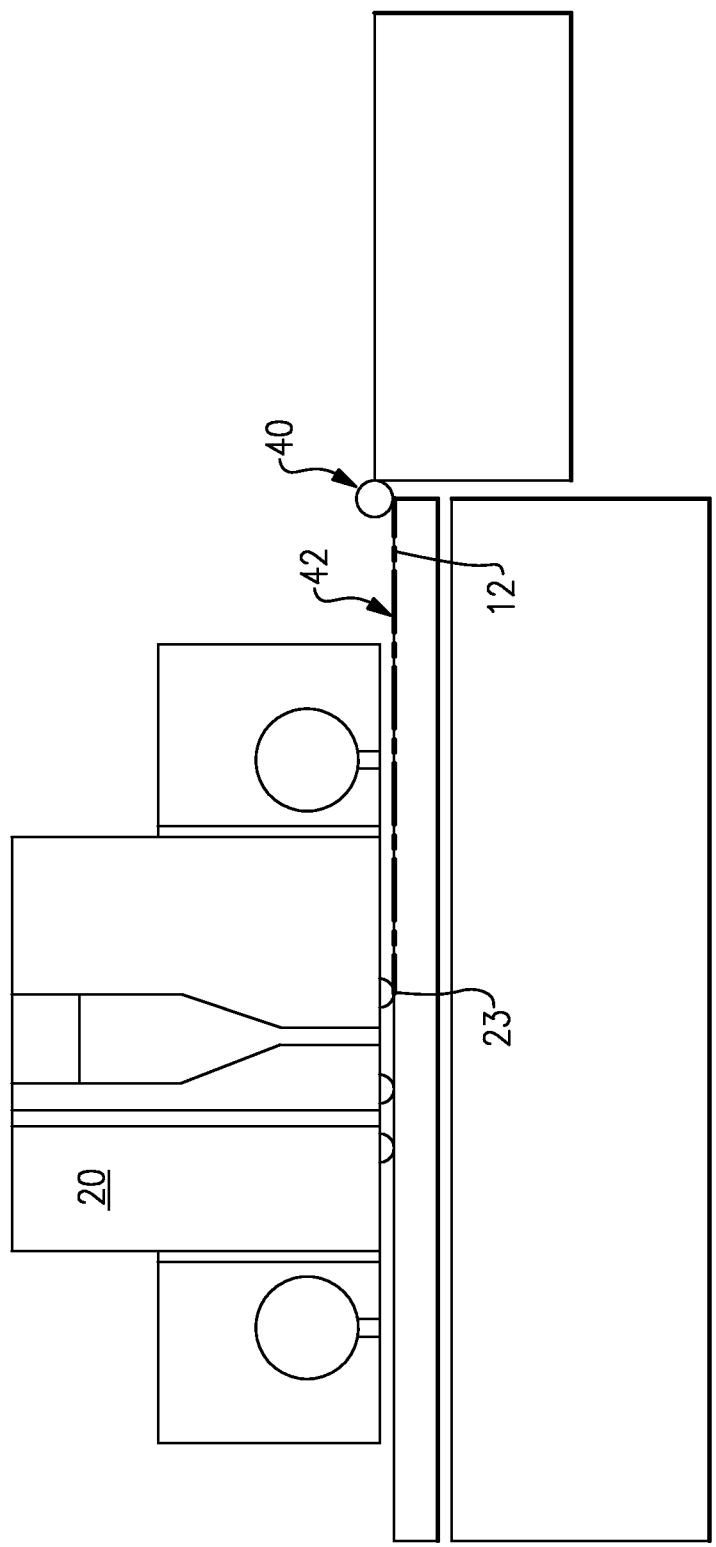
FIG. 2 is a sectional view illustrating an arrangement including a bond metal injection tool in accordance with the prior art, the tool having been moved from a parking location onto a mold plate for filling cavities.

A bond metal injection tool 101 (FIG. 3) according to an embodiment herein will now be described. The injection tool 101 can be used in an arrangement to fill cavities in a mold plate similar to the mold plate described above relative to FIGS. 1 and 2. The parking space 32 and injection tool can be similar to the above-described injection tool except for differences as pointed out as follows. In one example, the parking space can be made of various materials. In one example, a molybdenum plate can be chosen for the parking space, because of its minimal coefficient of thermal expansion ("CTE") and non-wetting characteristics with respect to solder material.

Figure 3:
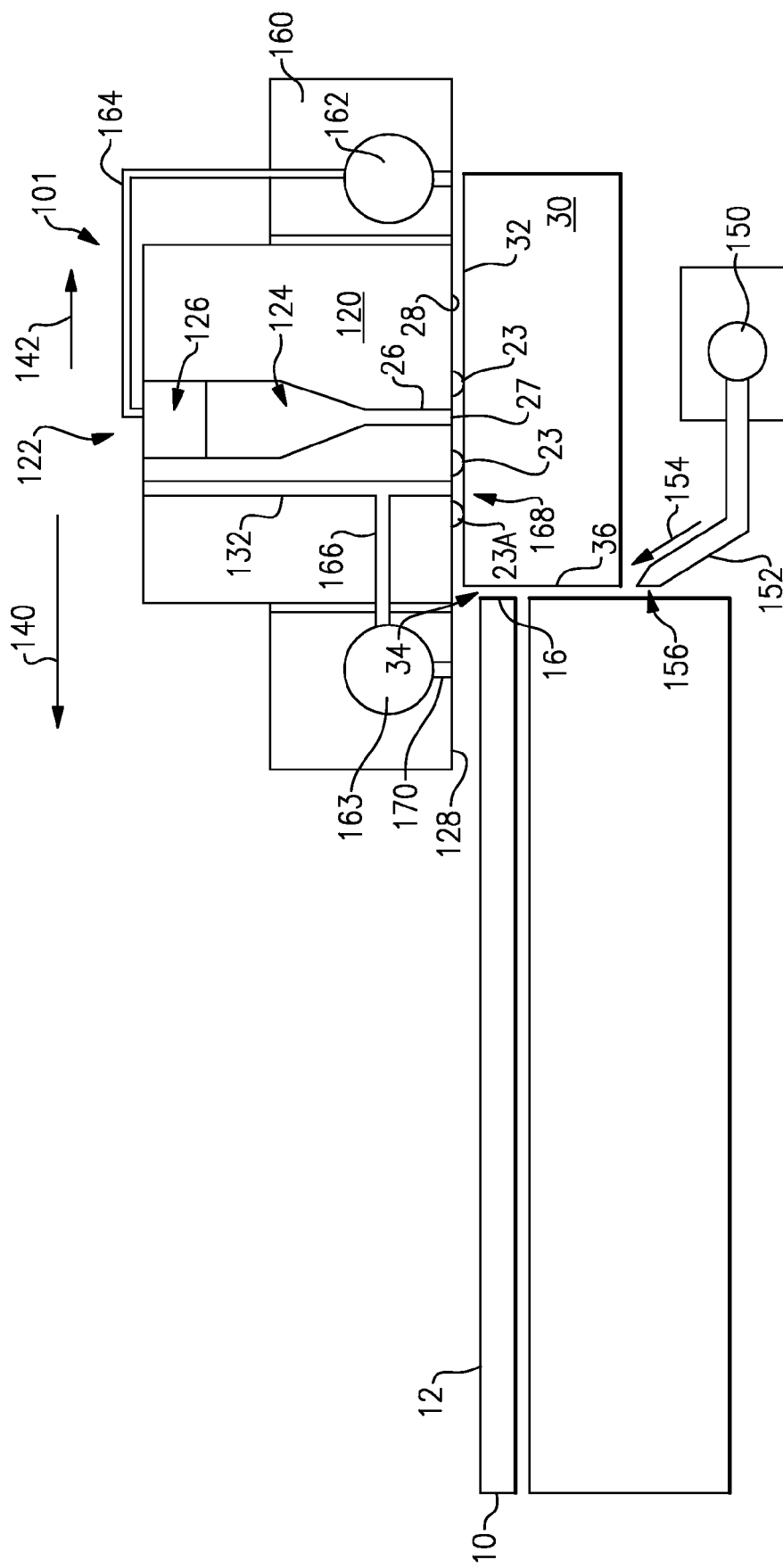
FIG. 3 is a sectional view illustrating an arrangement including a bond metal injection tool in accordance with an embodiment herein, the tool being parked at a parking location.

Referring to FIG. 3, a fill head 120 of the injection tool 101 contains a sealed chamber 122 in which a molten bond metal 124 and a gas 126 can be disposed. Typically, the bond metal is tin or a solder or eutectic alloy which includes at least tin, such as a solder selected from the group consisting of tin-silver, tin-silver-cobalt, tin-silver-zinc, tin-silver-bismuth, tin-copper-zinc, and tin-silver-copper, among others. The solder could have other compositions, such as compositions which include indium, lead or a combination thereof or even other compositions, depending upon packaging requirements. As seen in FIG. 3, the fill head has a seal 23 which is compressed between a surface 28 of the fill head and the parking surface 32. The seal 23 encloses a volume surrounding the nozzle 26 between the surfaces 28, 32.

Figure 4:
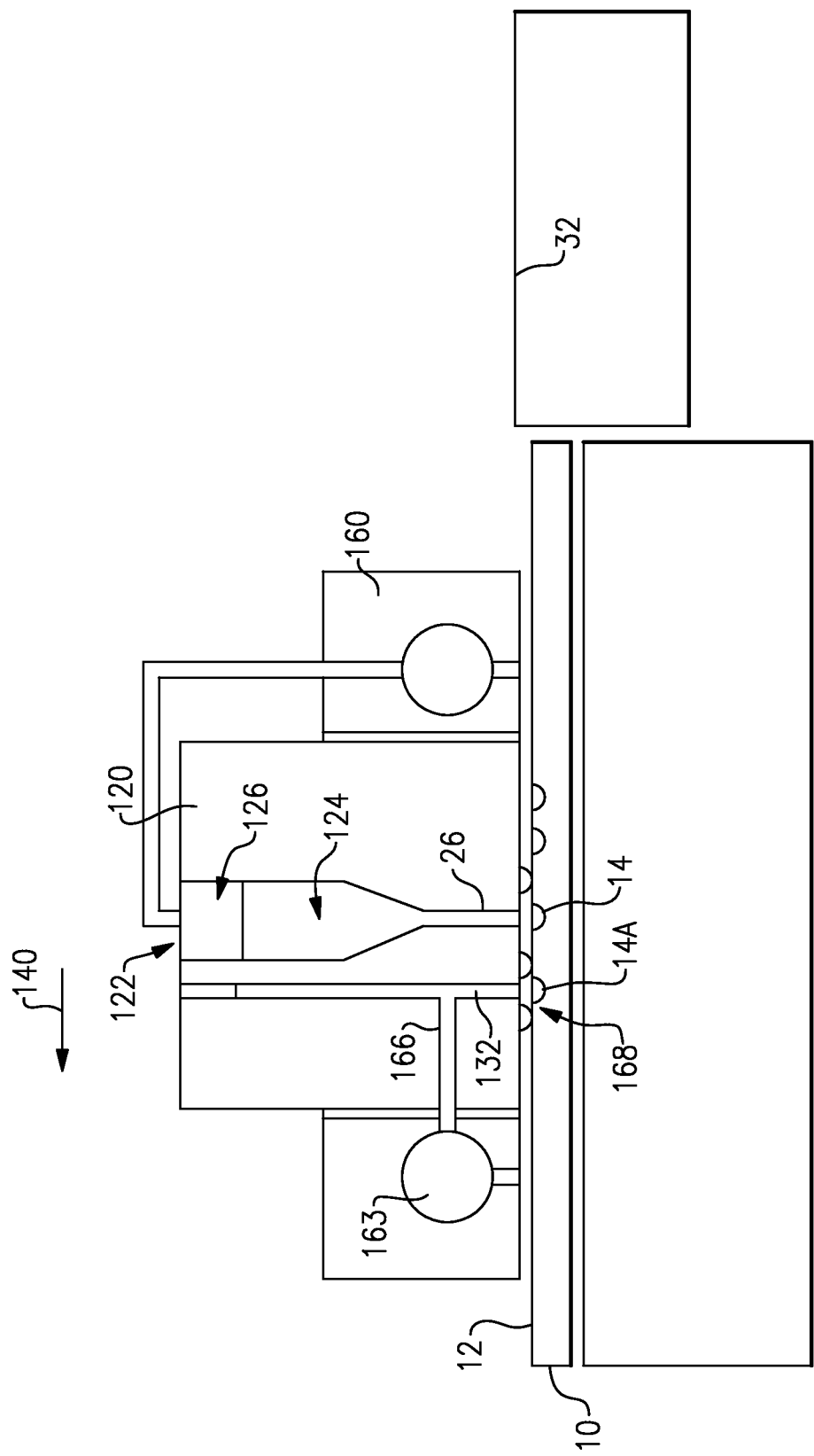
FIG. 4 is a sectional view illustrating an arrangement including a bond metal injection tool in accordance with an embodiment herein, the tool having been moved from a parking location onto a mold plate for filling cavities.

The injection tool can include a pressure controller 160, which can include a manifold 162 and a pump (not shown) and can be connected to a source (not shown) of gas under pressure. The pressure controller 160 can include a valve (not shown) for controlling a flow of gas between the manifold 162 and the chamber 122 through a tube 164. Referring to FIG. 4, when the head is filling the cavities in the mold, the pressure controller can supply a gas 126 from the manifold to the chamber 122 under positive pressure to force the solder 124 from the chamber through the nozzle 26 and into the cavities 14 of a mold plate 10. The mold plate 10 typically is not wettable by solder and can be formed of a material such as borosilicate glass which is selected for its transparency in permitting optical inspection and for its thermal properties similar to silicon. The gas 126 can be an inert gas or other gas which does not oxidize solder. This can help avoid oxidation of the solder within the chamber 122 (FIG. 3) or may help avoid solder from being oxidation of solder at other locations such as on parking surface 32 (FIG. 3) or the mold plate surface 12. In one embodiment, the gas can be nitrogen ($N_2$).

In addition to pressurizing the gas in the chamber 122, the pressure controller 160 can also operate in another mode to reduce the pressure of the gas within the chamber 122, that is, to reduce the pressure to a level at which the solder is inhibited from exiting through the nozzle 26. In one example, the pressure controller can apply a vacuum to the chamber 122, that is reduce the pressure of the gas to a pressure below atmospheric pressure, i.e., to negative pressure. As used herein, "applying a vacuum" to a chamber, refers to reducing the pressure within the chamber to a level below atmospheric pressure, that is to negative pressure with respect to the ambient atmospheric pressure. This usage shall control throughout this disclosure, even though the actual pressure level within the chamber can be substantial, and even though that pressure level is not a vacuum according to strict scientific usage. In such case, the negative pressure within the chamber allows atmospheric pressure at the nozzle opening 27 to force the solder upward in a direction towards the chamber 122.

FIG. 3 illustrates operation when the head is parked on the parking surface 32. That is, the head surface 28 is juxtaposed with the surface 32 of the parking space 30, i.e., in a confronting relation, with the head surface 28 sealed against the parking surface 28 by seal 23. Specifically, the pressure controller 160 can operate a pump (not shown) to draw the gas in a direction 142 away from the chamber 122 through tube 126. At such time, the pressure can be reduced within the chamber 122 above the level of the solder 124, and may be reduced to negative pressure. The pressure controller 160 may reduce the pressure sufficiently to inhibit the solder from exiting the nozzle 26. The reduced pressure may be sufficient to prevent the solder from exiting the nozzle and may have sufficient force to draw the solder inwardly within the nozzle and away from the head surface 28. In this way, the reduced pressure can inhibit or prevent the solder from being ejected onto surfaces of the parking space or onto the mold plate surface at locations other than the cavities where desired.

Thus, at a time when the head is moved from the parking space 30 onto the mold plate 10, as seen in FIG. 4, the upward force upon the solder 124 caused by the reduced pressure within the chamber can prevent the solder 124 from exiting the opening 27 of the nozzle 26, and may even draw the solder inwardly up the nozzle and away from surface 28.

As further seen in FIG. 3, the head can include a tube 132 coupled to an inlet 168 in the head surface 28. The inlet 168 opens within a volume enclosed within a seal 23, 23A between the head surface 28 and the parking surface 32 or mold plate surface 12 that is juxtaposed with the head surface. That is, the inlet 168 is sealed adjacent to the parking surface when the head is parked. The inlet 168 is sealed adjacent to the mold plate surface 12 when the head is being used to fill the mold plate cavities. The tube 132 extending from the inlet 168 can be coupled to a manifold 163 through tube 166. When the head is being used to fill the mold plate, the pressure controller can activate a pump (not shown) to draw gas into manifold 162 from tube 132 and reduce the pressure within the volume enclosed by seal 23, 23A.

The inlet 168 is positioned ahead of nozzle 26 in a direction of movement 140 of the head 120 along the mold plate surface 12. Referring to FIG. 4, when the head is moved in that direction and the inlet 168 passes over a cavity 14A in the mold plate surface 12, the inlet 168 can evacuate gas or material present in the cavity before nozzle 26 arrives to fill the cavity 14A.

Referring again to FIG. 3, manifold 163 can further include an outlet 170 at a surface 128 which is directed towards the juxtaposed surface. Such outlet 170 can be used to direct a jet of gas downward towards the juxtaposed parking or mold plate surface. Thus, the outlet 170 can be used to direct a flow of gas, such as a non-oxidizing gas, e.g., nitrogen or an inert gas towards the juxtaposed surface. In one example, manifold 163 can be operated automatically by pressure controller 160.

As further seen in FIG. 3, the bond metal injection tool 101 can further include a manifold 150, tubing 152 and a nozzle 156 not carried by the head 120 for directing a gas 154 into the gap 34 between edge surfaces 16, 36 of the mold plate and the parking surface 32. These elements can be activated when the head 120 moves from the parked position juxtaposed with parking surface 32 into an operating position juxtaposed with the mold plate surface 12, as depicted in FIG. 4. The gas can be a non-oxidizing gas, that is, an inert gas or other gas that does not normally react with solder to form an oxide. For example, the gas can be nitrogen. The nozzle 156 can direct the gas towards the gap 34 or into the gap. In this way, the gap 34 can be purged of air which could oxidize solder carried by the head 120 as it passes the gap onto the mold plate surface 12.

Figure 5:
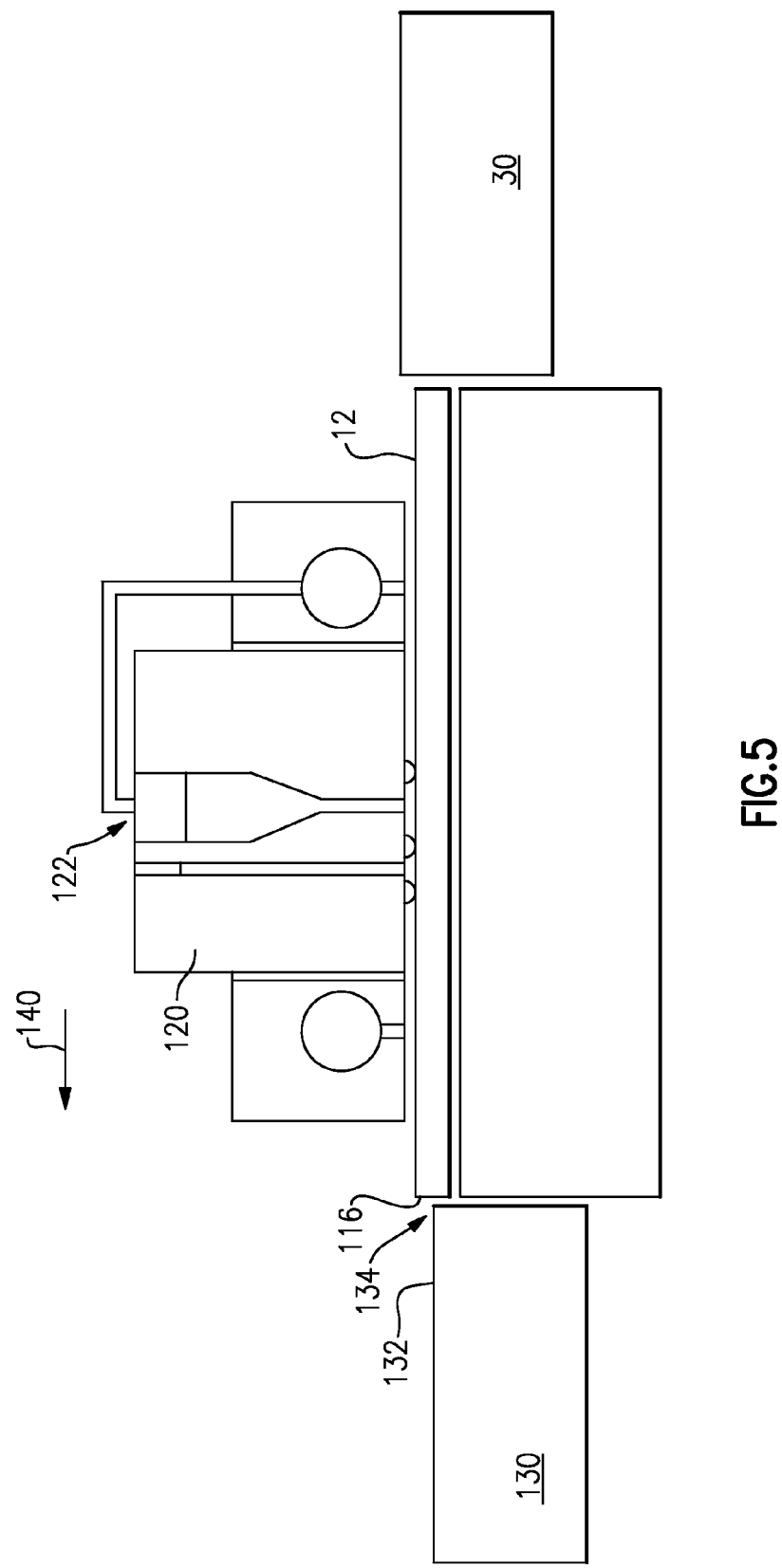
FIG. 5 is a sectional view further illustrating an arrangement in which a bond metal injection tool can be moved from a first parking surface onto a mold plate surface and further onto a second parking surface.

FIG. 5 further illustrates an arrangement which includes a second parking space 130 disposed adjacent to an edge 116 of the mold plate which is opposite from the parking space 30 discussed above. Typically, after the cavities in the mold plate are filled, the head 120 can be moved in direction 140 away from the mold plate surface 12 onto the second parking space 130. At such time, the pressure controller can reduce the pressure within the chamber 122 to inhibit or prevent solder from being deposited onto the mold plate 12, a surface 132 of the second parking space 130 or in places other than into the cavities. The pressure may be reduced to negative pressure. In addition, another nozzle and accompanying apparatus similar to nozzle 156 described above (FIG. 3) can be used to purge the gap 134 of air while the head 120 moves off the mold plate surface 12 onto the second parking surface 132.

Figure 6:
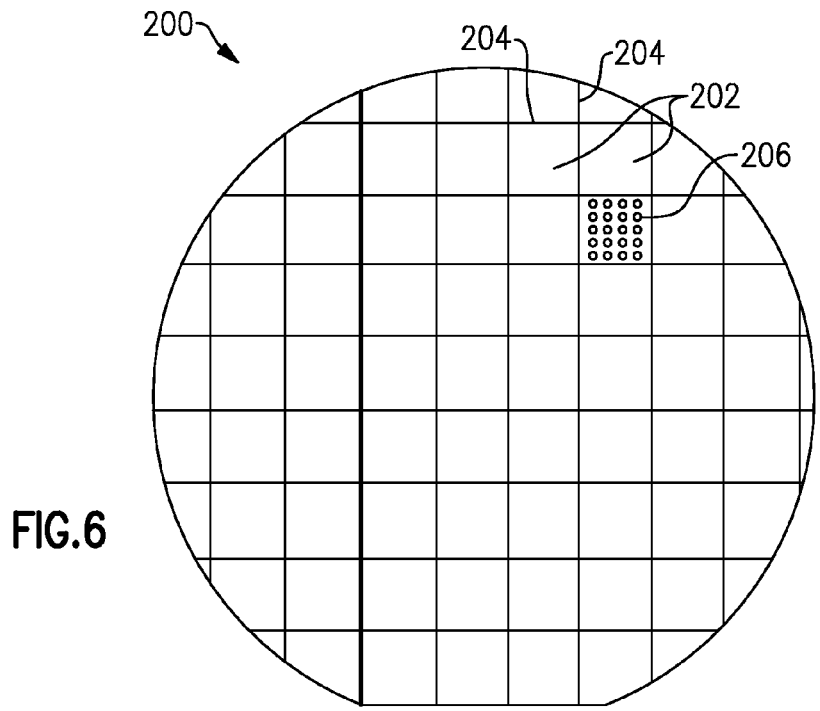
FIG. 6 is a plan view illustrating a wafer to which bond metal bumps can be applied simultaneously at a wafer level, in accordance with an embodiment herein.
Figure 7:
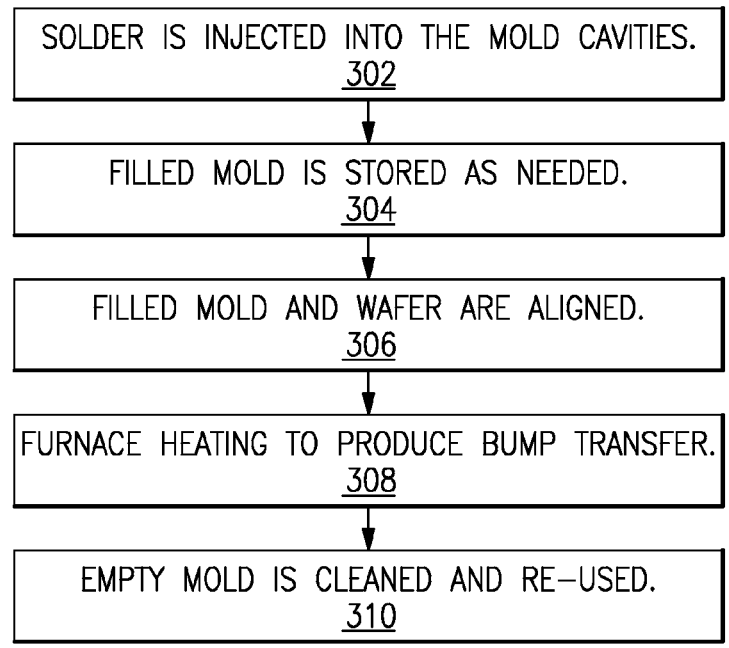
FIG. 7 is a flow diagram illustrating steps in a wafer bumping method in accordance with an embodiment herein.

A method of forming bumps of a bond metal, for example, solder bumps, on a microelectronic element will now be described with reference to FIGS. 6 and 7. A microelectronic element such as a wafer 200 (FIG. 6) can include a plurality of individual microelectronic elements such as semiconductor chips 202 which are attached together at dicing lanes 204. The wafer typically has a 300 millimeter diameter, but other sizes can also be used. The semiconductor chips have contacts 206 exposed at a contact-bearing face of the wafer, such face typically being a "front" face of the wafer.

A method can be used to form solder bumps simultaneously on contacts of each semiconductor chip 202 of the wafer. Referring to FIG. 7, in a step 302 of such method, a bond metal injection tool 101 such as described above (FIGS. 3-4) can be used to inject solder into the cavities of a mold plate 12 having a diameter roughly equal to or larger than wafer 200. The mold plate 12 can have cavities which match the number and placement of contacts of the chips on the wafer.

The head 120 starts from a parked position on parking surface 32 (FIG. 3). To fill the cavities, the head 120 moves ("steps") off the parking surface 32 onto the mold plate 12. While the head is on the parking surface 32 and while the nozzle 26 traverses the gap 34 onto the mold plate surface, the pressure controller reduces the pressure within the solder chamber 122 to inhibit solder present at the nozzle opening 27 from being dislodged onto the parking surface 32, into gap 34 or onto the mold surface 12. In such way, the pressure controller can help avoid solder masses or streaks from being deposited onto the mold plate surface, the parking surface or the gap. Also while the head 120 (and particularly, the nozzle 26) is moving onto the mold plate surface 12, manifold 150 can direct a jet of non-oxidizing gas such as nitrogen or an inert gas to the gap or into the gap 34. This action helps avoid oxidation of solder at the nozzle opening 27 when the solder nozzle 26 traverses the gap, and helps avoid any molten solder that may still become dislodged at that time from being oxidized.

Thereafter, once the head 120 has moved onto the mold plate surface (FIG. 4), filling of the mold plate cavities can then begin. When the head is filling the mold plate cavities, the pressure controller 160 now pressurizes the gas, that is raises the pressure of the gas within the chamber 122 above the reduced pressure at which the chamber 122 is maintained when the head 120 is parked. The raised pressure causes the solder to be ejected through the nozzle 26 into the cavities of the mold. Typically, the jet of non-oxidizing gas from manifold 150 is not needed while the mold cavities are being filled and, therefore, can be stopped at that time. However, the jet can be continued during such operation as it may help to spread the non-oxidizing gas into the vicinity of where the mold cavities are being filled.

Once the head 120 has finished filling the cavities, it is moved onto the second parking surface 132 (FIG. 5). Prior to or during such movement, the pressure controller again can switch from pressurizing the gas inside the solder chamber to reducing the pressure therein. Again, the reduced pressure within the chamber helps to avoid solder from being dislodged when the nozzle 26 traverses, i.e., moves over the gap 134 between the mold plate 12 and the second parking surface 132. Also at that time, another jet of non-oxidizing gas can be directed to such gap or into such gap 134 to help avoid solder from being oxidized during the movement of the head (and in particular, the nozzle 26 thereof) onto the second parking space.

After the head moves onto the second parking space 132, a temperature of the mold plate can be lowered by lowering a temperature of hot plate coupled thereto. The mold plate can then be removed from the tooling and stored (step 304) until needed and ready to attach the solder therein to a wafer. Thereafter, as indicated at step 306, a wafer 200 (FIG. 6) and a filled mold plate 12 can be inserted and aligned in a fixture for joining. The wafer, filled mold plate and fixture can then be heated together (e.g., in a furnace) until the bumps reach a melting temperature. At such time (step 308), the bumps can acquire a rounded, e.g., spherical shape, which can cause the bumps to wet the contacts 206 of the chips and adhere thereto. When the furnace temperature is lowered, then bumps remain attached to the chip contacts rather than the mold plate. The bumps typically solidify with spherical shape, although other shapes may be possible. The mold plate can then be removed from the fixture and cleaned for reuse again in forming bumps on another wafer.

While the invention has been described in accordance with certain preferred embodiments thereof, those skilled in the art will understand the many modifications and enhancements which can be made thereto without departing from the true scope and spirit of the invention, which is limited only by the claims appended below.

What is claimed is:

1. A bond metal injection tool, comprising:
a fill head having a sealed chamber for containing a molten bond metal and a gas, and a nozzle at an outlet of the chamber for directing a flow of the molten bond metal from the chamber and then out through the nozzle into cavities in a major surface of a mold; and
a pressure control device operable to controllably apply pressure within the chamber to eject the bond metal from the nozzle into the cavities when the pressure is applied within the chamber, and to controllably apply a vacuum within the chamber to prevent the bond metal from being ejected from the nozzle when the vacuum is applied within the chamber, wherein the fill head is movable from a first position in which the nozzle is juxtaposed with at least one of the cavities or a plane defined by the major surface, and a second position in which the nozzle is juxtaposed with a plane defined by a parking surface of a parking space, wherein the pressure control device is operable to apply the vacuum within the chamber separately from an operation of filling the cavities with the bond metal, to prevent the bond metal from being ejected from the nozzle when the nozzle is removed from the major surface to the parking surface when bond metal remains in the fill head immediately after filling the mold cavities in the major surface, wherein the parking space has an edge surface extending in a direction transverse to the plane defined by the parking surface, at least a portion of the edge surface of the parking space being spaced apart from an adjacent edge surface of the mold to define a gap, wherein the pressure control device is operable to apply the vacuum within the chamber to prevent the bond metal from being ejected from the nozzle when the nozzle moves from the first position away from the mold cavities across the gap to the second position; and a second nozzle to direct a flow of a second gas to the gap between the mold and the parking space.

2. The bond metal injection tool as claimed in claim 1, wherein the fill head is configured to be sealably engaged with the mold such that a volume surrounding an opening of the nozzle is enclosed between the fill head and the mold when the fill head is sealably engaged with the mold, the fill head further including an aperture at the juxtaposed surface for applying a vacuum to at least one of the mold cavities, wherein the aperture is positioned ahead of the nozzle opening in a direction of a movement of the nozzle opening across the major surface, so as to permit evacuation of the at least one mold cavity before ejection of the bond metal into the at least one mold cavity.

3. The bond metal injection tool as claimed in claim 1, wherein the second nozzle is adapted to direct the second gas into the gap.

4. The bond metal injection tool as claimed in claim 3, wherein the second nozzle is adapted to eject a type of the second gas which does not oxidize the bond metal.

5. The bond metal injection tool as claimed in claim 4, wherein the pressure control device is further operable to cause the second gas to flow whenever the nozzle is moved to a position juxtaposed with the parking space and stop the flow of the second gas whenever the nozzle is moved to a position juxtaposed with at least one of the major surface or at least one cavity therein.

6. The bond metal injection tool as claimed in claim 1, wherein the bond metal includes tin.

7. The bond metal injection tool as claimed in claim 6, wherein the bond metal includes at least one alloy of tin selected from the group consisting of tin-silver, tin-silver-cobalt, tin-silver-zinc, tin-silver-bismuth, tin-copper-zinc, tin-silver-copper.

8. The bond metal injection tool as claimed in claim 1, wherein the pressure control device is operable to apply the vacuum within the chamber to prevent the bond metal from being ejected from the nozzle when the nozzle moves from the second position away from the parking space across the gap to the first position.

9. The bond metal injection tool as claimed in claim 8, wherein the plane defined by the parking surface is raised relative to the plane defined by the major surface of the mold to define a step height difference between the adjacent edge surfaces of the parking space and the mold, and the pressure control device is operable to apply the vacuum within the chamber to prevent the bond metal from being ejected from the nozzle when the nozzle traverses the step height difference when the nozzle moves from the second position away from the parking space across the gap to the first position.

* * * * *